United States Patent [19]

Fürstenberg

[11] 4,217,119
[45] Aug. 12, 1980

[54] AIR FILTERING SYSTEM

[75] Inventor: Joachim Fürstenberg, Aichelberg, Fed. Rep. of Germany

[73] Assignee: LTG Lufttechnische GmbH, Stuttgart, Fed. Rep. of Germany

[21] Appl. No.: 906,400

[22] Filed: May 16, 1978

Related U.S. Application Data

[63] Continuation of Ser. No. 725,836, Sep. 23, 1976, abandoned.

[30] Foreign Application Priority Data

Sep. 24, 1975 [DE] Fed. Rep. of Germany ....... 2542568

[51] Int. Cl.$^2$ .............................. B01D 46/26
[52] U.S. Cl. ........................ 55/351; 55/400; 55/492; 55/502
[58] Field of Search ............... 55/294, 296, 351, 354, 55/492, 498, 500–502, 290, 400; 209/288, 406, 407, 409–411; 242/55.1, 55.17

[56] References Cited

U.S. PATENT DOCUMENTS

| 308,844 | 12/1884 | Kuhnmunch | 209/411 |
| 1,814,428 | 7/1931 | Bishop | 55/290 |
| 2,788,860 | 4/1957 | Turner | 55/294 |
| 3,596,442 | 8/1971 | Neumann | 55/354 |
| 3,667,195 | 6/1972 | Angilly, Jr. et al. | 55/290 |
| 4,078,995 | 3/1978 | Utt | 209/288 |

FOREIGN PATENT DOCUMENTS

| 1607719 | 3/1972 | Fed. Rep. of Germany | 55/351 |
| 136362 | 7/1952 | Sweden | 55/294 |
| 890674 | 3/1962 | United Kingdom | 55/354 |

Primary Examiner—David L. Lacey
Attorney, Agent, or Firm—Edwin E. Greigg

[57] ABSTRACT

An air filtering system for large installations such as spinning machine rooms, textile factories, etc., has a rotating drum with permeable walls through which air is aspirated to the interior of the drum while the accumulated contaminants are removed during the rotation of the drum by a reciprocating vacuum cleaner. In order to protect the bearings of the drum and the drive mechanism from contact with uncleaned air, the drum is carried by rollers which contact only the interior surface of the drum. The drive motor and transmission are also placed inside the drum.

15 Claims, 4 Drawing Figures

AIR FILTERING SYSTEM

CROSS REFERENCE TO RELATED APPLICATION

This is a continuation application of application Ser. No. 725,836, filed Sept. 23, 1976, and now abandoned.

BACKGROUND OF THE INVENTION

The invention relates to an apparatus for filtering the air used in spinning machines and installations as well as other textile industries to clean it from fibers, dust etc. The filtering system includes a rotating filtering drum which is mounted to rotate about a horizontal axis and through which air flows from the outside to the interior.

Filter systems of this type are often used in the textile industry, for example to filter the exhaust air from machine rooms in a continuous manner, especially to filter out fibers and dust such as enter the air in large quantities in such factories, although other applications are possible. Generally such filtering drums are relatively large and heavy because the quantities of air which must be cleaned are very large. Thus it is not a simple matter to construct bearings for such drums which can stand up to the very large weight and the possibility of soiling and which produce a problem of positioning due to the fact that at least one end of the drum is usually open.

In a known apparatus of this type (German Offenlengungsschrift No. 1,607,728) the filtering drum has a shaft affixed to the center of the closed end of the drum and mounted in an associated bearing and provided with a gear for rotary driving while the open end of the drum is carried on two rollers at its circumference. The bearing for the shaft as well as the carrier rolls are all located external to the drum itself, i.e., in a space which is filled with uncleaned air so that the mechanical devices, i.e., the carrier rollers and the bearings, etc., are exposed to the presence of fibers, dust, etc., and thus are subject to soiling and the associated wear and tear and must be cleaned very often or will begin to offer great resistance to the motion. While it would be possible to mount the bearing at the closed end of the drum within a housing having a rotary seal, this would increase the constructional expense and would make it difficult to cool the motor if the motor was also included in the housing.

In another known apparatus (French Pat. No. 1,231,871,) the drum is also carried on external bearing and carrier rolls. However, in this case, the electrical motor is located in the cleaned air current and drives the drum by means of a pinion which engages an internal rack at the open end of the drum. Thus the electric motor may be cooled with clean air but the very large circular rack which must be machined to exact tolerances is very expensive and thus substantially increases the total expense of the filtering system. Furthermore, the external bearings are subject to the soiling alluded to hereabove and all of the disadvantages resulting therefrom.

OBJECT AND SUMMARY OF THE INVENTION

It is a principal object of the invention to provide a filtering drum for air flow of the general type described above of such construction as to have bearings and drive means arranged to be protected against soiling and wear and tear while maintaining a simple construction and reliable operation. This and other objects are attained, according to the invention, by providing carrier rollers for the drum which are disposed in the interior space of the filtering drum.

By placing the carrier rollers of the filtering drum within the interior volume, these rollers and their bearings are surrounded only by air already cleaned by the filtering drum and thus are no longer exposed to rapid and heavy soiling. Furthermore, these bearings need not be additionally protected against soiling and are thus less expensive to produce. Cleaning of the bearings and the rollers can be performed at longer intervals and may be dispensed with altogether. Furthermore, the disposition of the carrier roller in the interior of the drum also permits locating the drive motor within the cleaned air without requiring the above-mentioned circular rack. Thus, in a preferred exemplary embodiment, at least one of the carrier rollers, and possibly all of them, are at the same time the driving rollers for the drum and may themselves be driven by a drive motor also preferably located within the interior of the drum. The considerable weight of the filtering drum makes it possible to embody the drive rollers as friction rollers not requiring gear teeth. The cooling of the electric motor is enchanced by the fact that the cooling air is clean. Another advantage of the novel location of the bearings for the filtering drum is that it is space-saving because it is located entirely within the drum so that the overall frame of the system and thus the overall length of the construction can be substantially of the same size as the drum itself.

The invention will be better understood as well as further objects and advantages thereof become more apparent from the ensuring detailed description of two exemplary embodiments of the invention taken in conjunction with the drawing.

DESCRIPTION OF THE PREFERRED EMBODIMENTS

Figure 1:
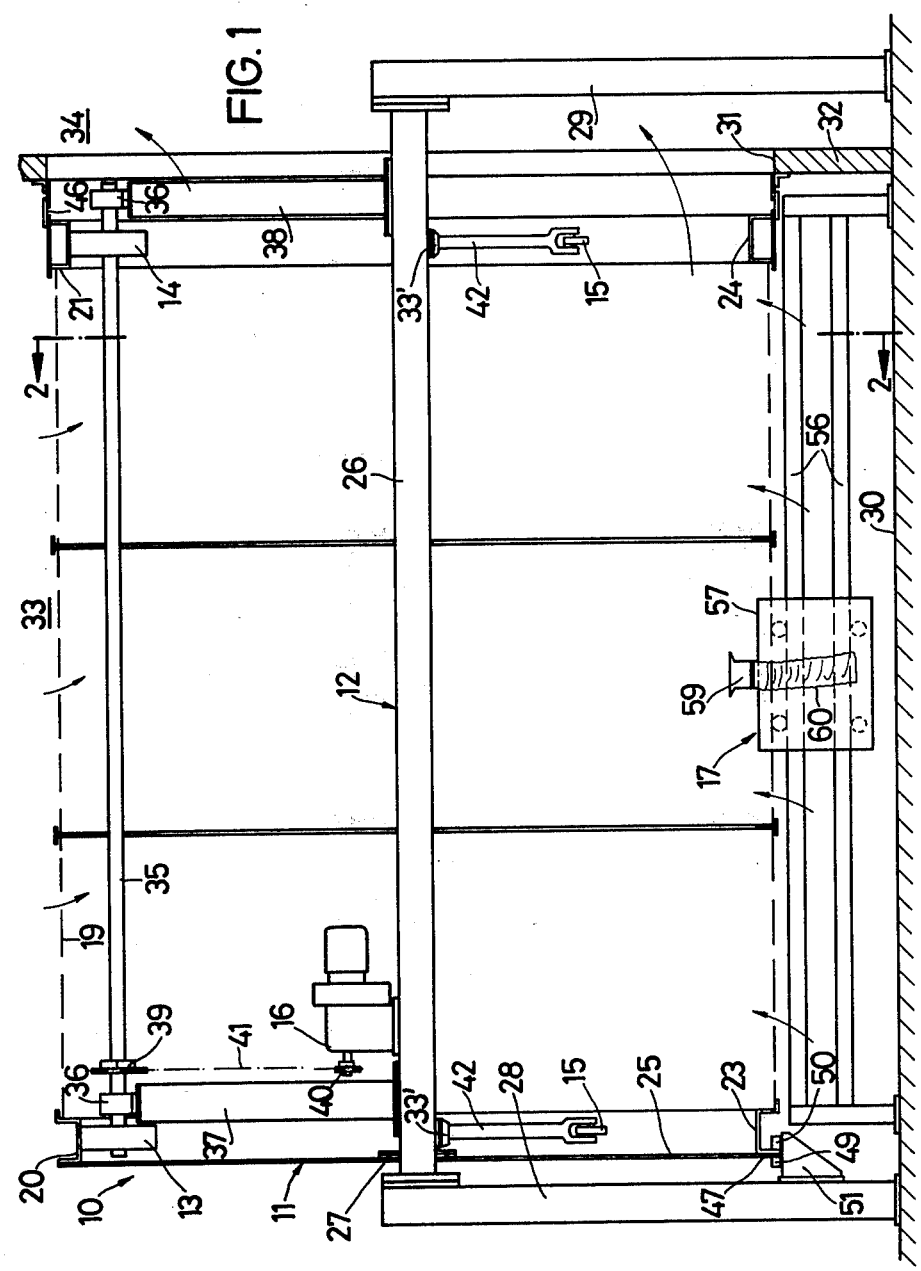
FIG. 1 is a schematic and partially sectional side view of one exemplary embodiment of the apparatus according to the invention.
Figure 2:
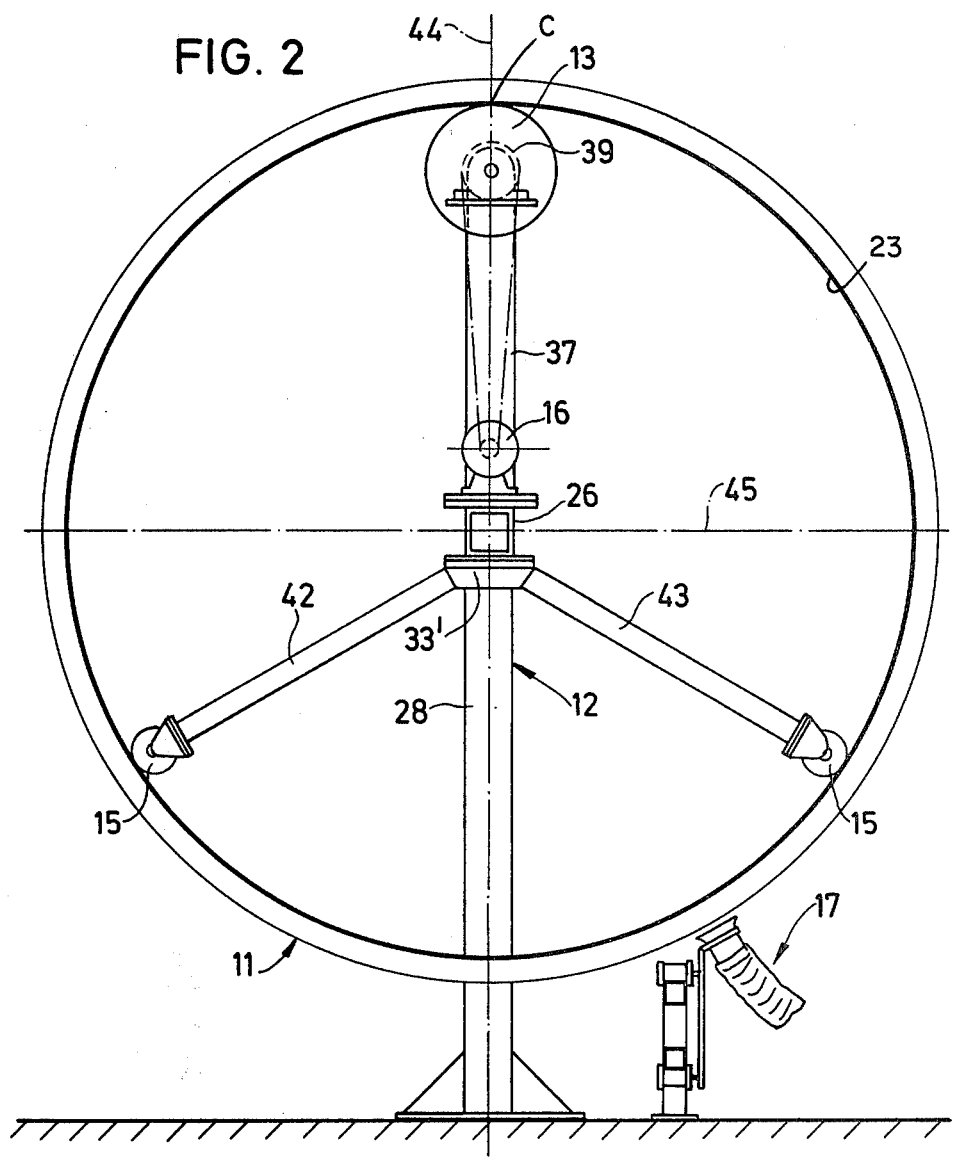
FIG. 2 is a schematic representation of a section along the line 2—2 in FIG. 1.

The filtering system 10 illustrated in FIGS. 1 and 2 for the purpose of filtering air and removing therefrom fibers, dust, etc., includes a filtering drum 11 and a very simple, narrow frame 12 in which are mounted carrier rollers 13, 14 and support rollers 15 for providing rotary bearing means for the filtering drum 11. The frame also supports a drive motor 16 for driving the drum 11 and a motorized suction mechanism 17 for continuously cleaning the filtering surface 19 of the filtering drum 11. The carrier rollers 13 and 14, as well as the support rollers 15, are located entirely within the interior volume defined by the cylindrical surface of the filtering drum 11 and are thus located in the cleaned air stream.

The filtering surface 19, which defines a right circular cylinder, extends nearly over the entire length of the filtering drum 11 and may be, for example, a perforated screen, a sieve, a metal mesh, a filtering cloth or the like, as required for the particular application. On both axial ends of this filtering surface 19, the drum 11 is provided with two metal rings 20, 21 which may have U profiles as shown, open to the outside, whose interior surfaces provide the tracks 23, 24 for the two carrier rollers 13, 14 and for the four alignment or support rollers 15. The left end of the filtering drum 11 as seen in FIG. 1 is closed off by a flat face plate 25 which is perforated in the center through which extends a horizontal beam member 26 included as a part of the frame 12. As shown, the beam 26 may be hollow and have a quadratic cross section. A rotary seal 27 provides an air seal between the face plate 25 and the beam 26. At both ends, the beam 26 is supported by two vertical hollow pedestals or standards 28, 29 which are, in turn, fastened on a floor plate 30 or on the floor itself and thus are located outside of the filtering drum 11. The right end of the filtering drum 11 as seen in FIG. 1 remains substantially open for the passage of air and is aligned with an air flow aperture 31 in a wall 32 which separates the chamber or room 33 in which the drum 11 is located and which receives the air to be filtered from the clean air channel 34 which conducts the clean air to further locations, not shown. In a manner not shown, the air may be transported by a suction mechanism located within the clean air channel 34.

The weight of the filtering drum 11 is supported entirely by the two carrier rollers 13, 14 whose point of contact is the top (zenith) C of the carrier tracks 23, 24 FIG. 2 and which are fastened on a common shaft 35 to rotate in unison. The rollers are embodied as friction rollers and do not have teeth but may be covered with a friction surface. The shaft 35 may be carried in two locally fixed bearings, either sleeve bearings or roller bearings, which are disposed in radial arm means 37, 38 whose lower ends are fastened on the top of the beam 26. The shaft 35 carries a sprocket wheel 39 which cooperates with a pinion 40 of the electric motor 16 via a chain 41 and thus provides a drive means for driving the shaft 35 and the carrier rollers 13, 14. The carrier rollers 13, 14 are the only drive means for the drum 11 whose own great weight provides the necessary friction between the rollers and the tracks 23, 24. The geared electric motor 16 is preferably disposed near the closed face of the filtering drum 11 and close to its rotational axis because the air velocity is lowest in that location, so that only minimum amounts of dust which may still be present even in the cleaned air can reach the motor and the gear train 39, 40, 41.

Fastened to the bottom of the beam 26 are two plates 33' on each of which are mounted two arms 42, 43 extending radially with respect to the drum and located in mutually symmetric manner to extend below the central horizontal plane 45 of the drum 11. At their free ends, the arms 42, 43 are provided with alignment rollers 15 which complement the rotary mounting of the filtering drum 11 in such a manner as to define its center of rotation to be the central long axis of the beam and which prevent a change of the position of the drum in space, other than rotation. Preferably, the angle between each pair of arms 42, 43 is approximately 120° so that the alignment rollers and the carrier rollers 13, 14 are evenly distributed about the interior track 23, 24. The load on the alignment rollers 15 is very small since the carrier rollers 13, 14 substantially support the drum 11 by themselves which means that only the carrier rollers 13, 14 need to be constructed to carry high loads, thus saving expense. An annular seal 46 is disposed between the edge of the filtering drum 11 at its open end and the wall 32.

In the exemplary embodiment illustrated in FIG. 1, the face plate 25 and the outer wall of the beam 23 constitute a flange 47 both of whose sides represent guide tracks to insure the axial positioning of the drum 11. For this purpose, both of these sides are contacted by guide rollers 49, 50 whose vertical axes of rotation are defined in an extension 51 at the pedestal 28. In the exemplary embodiment shown, the guide rollers 49, 50 are outside of the drum but, since they absorb only small forces, they may be very small and thus may be easily sealed against contamination.

Figure 4:
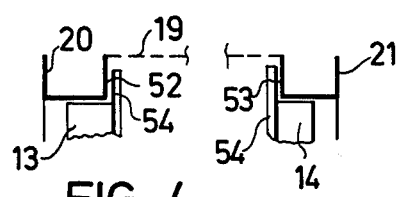
FIG. 4 is an axial sectional view of a second embodiment of the apparatus according to the invention.

It is possible, however, to provide axial securing of the drum 11 in such a manner that it takes place within the drum and thus within the cleaned air, for example by means of special guide rollers which would cooperate with guide surfaces in the inside of the drum. Such guide surfaces could be, for example, the mutually facing surfaces 52, 53 of the rings 20, 21. However, in a variant embodiment, it may be provided, as illustrated in FIG. 4, that the carrier rollers 13, 14 and/or the alignment rollers themselves provide the axial positioning by suitable embodiment with circumferential collars 54 cooperating with the associated guide surfaces 52, 53 on the drum 11.

The suction device 17 which provides the continuous cleaning of the filtering surface 19 of the drum 11 is of per se known construction including a carriage 57 continuously running back and forth on tracks 56 and carrying a suction nozzle 59 with an attached hose 60 which may be attached to a suitable suction device so that the nozzle continuously removes contaminations from the filtering surface and transports it to a collection point.

Figure 3:
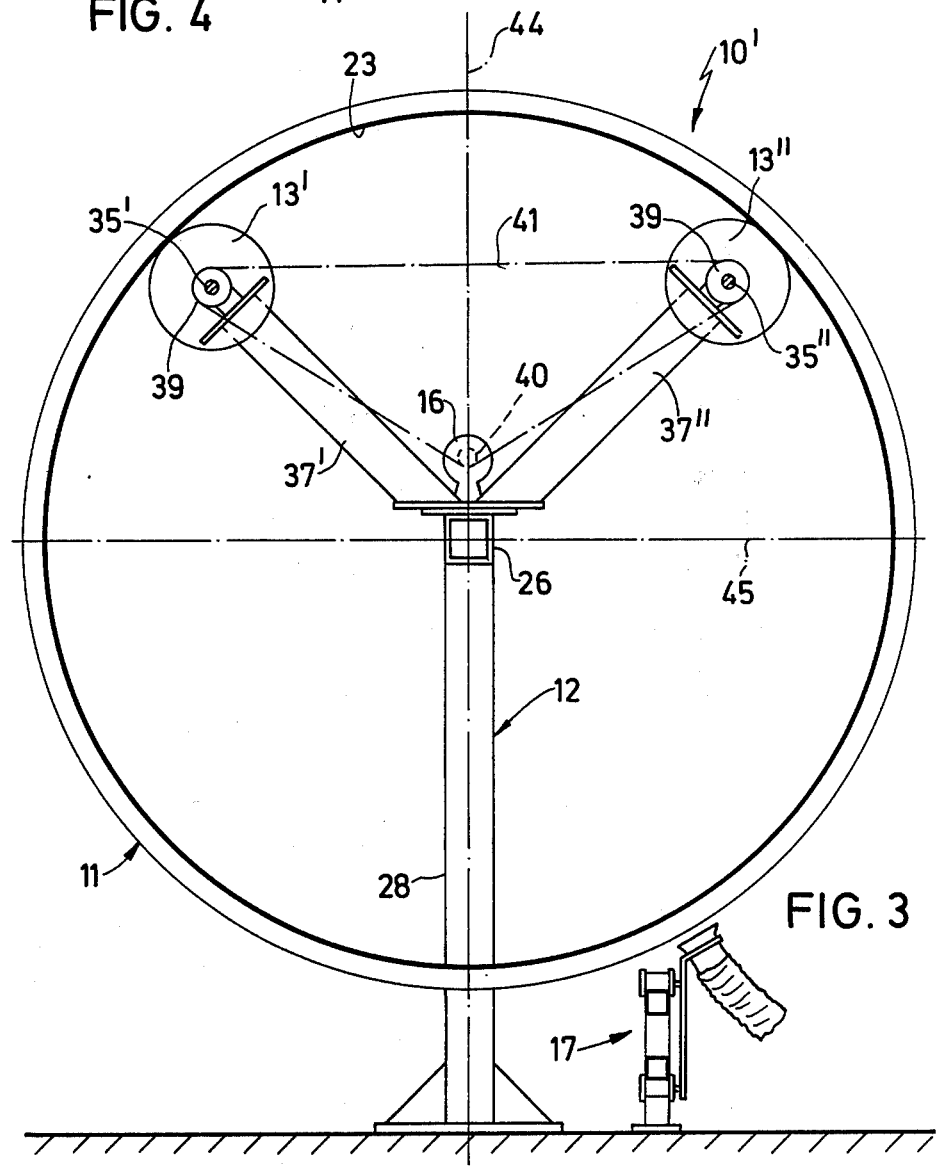
FIG. 3 illustrates a variant of the axial securing means in the embodiment of FIG. 1.

The second embodiment of the invention, illustrated in the axial view of FIG. 3, is differentiated from the embodiment of FIGS. 1 and 2 substantially in that the function of each of the carrier rollers 13, 14 is taken over by two carrier rollers 13', 13" although FIG. 3 shows only the pair of rollers 13', 13" which associates with the track 23. The other pair of rollers, which would cooperate with the second track 24, may be embodied in an identical manner. The shafts of each pair of rollers which are congruent in the illustration of FIG. 4 are connected by a common shaft 35', 35" as was the case for the carrier rollers 13, 14 in the embodiment of FIG. 1. Preferably, it may be provided that all four carrier rollers, i.e., the two pairs of rollers each of which has a roller 13', 13", are individually driven, which is accomplished in the illustrated example by providing a sprocket wheel 39 on each of the shafts 35', 35" and a chain 41 which envelops both sprocket wheels 39 as well as the pinion 40 of the electric motor 16, whereby the electric motor 16 drives both shafts 39 and thus drives all four carrier rollers in common. The pairs of rollers lying in the same diametral plane and thus associated with the same track 23 or 24 are displaced by an angle of approximately 120° and located symmetrically with respect to the vertical plane 44 of the drum 11. They are mounted at the upper free ends of radial arms 37', 37" which radiate from a carrier plate mounted on the beam 26 and they are located generally above the horizontal longitudinal plane 45 of the drum 11.

The embodiment 10' of FIG. 3 does not include alignment rollers such as were present in the embodiment of FIGS. 1 and 2 because the carrier rollers 13', 13" are so disposed as not only to support the drum but also to prevent any lateral displacement of their axes of rotation, i.e., they serve at the same time as alignment rollers. Furthermore, these rollers are also drive rollers and are suitably embodied as friction rollers. Any details of the embodiment of FIG. 3 not shown may be identical to those illustrated in FIGS. 1 and 2; in particular, the elements 11, 12, 16 and 17 may be exactly the same as those shown in FIGS. 1 and 2.

While it is preferably provided that one face of the filtering drum 11 is closed, the invention is easily applicable to drums in which both ends are open, because the apparatus according to the invention does not require a central bearing shaft mounted on one face of the drum. In the case where both ends are open, an especially large capacity and a great air flow is achieved, which may be useful in certain applications. The two open ends of the drum could be in mirror symmetry and each could be flush with an associated wall.

While it is advantageous to provide the chain drive 39, 40, 41, other suitable drive mechanisms are, of course, possible; in particular, the drive motor 16 may provide its power via a drive shaft and via at least one bevel gear train connected to at least one of the shafts 35, 35', 35''. In another possible embodiment, not shown, a geared motor could be coupled directly to one of the shafts 35, 35', or 35''. Other possibilities for applying motive power exist.

In many cases, it may be suitable to provide axial positioning of the drum 11 at the places where the rotary axis penetrates the drum, for example by means of axial thrust bearings, and especially suitably in the vicinity of the annlar seal 27.

The foregoing relates to preferred exemplary embodiments of the invention, it being understood that other embodiments and variants are possible within the spirit and scope of the invention, the latter being defined by the appended claims.

What is claimed is:
1. An air cleaning apparatus comprising:
an elongated air filter drum having two spaced transverse end openings;
means for closing one of said two transverse end openings;
an air filter drum mounting structure having: an elongated mounting shaft; at least two carrier rollers; and means for mounting said at least two carrier rollers to and at spaced locations along the elongated mounting shaft and within the interior of said elongated air filter drum, said at least two carrier rollers being mounted for rotation relative to their respective mounting means;
said elongated air filter drum being supported at spaced locations along its length by said at least two carrier rollers for rotation thereby about said elongated mounting shaft said elongated air filter drum having radially extending flange means at one end thereof;
guide roller means, for cooperating with said radially extending flange means, thereby defining the axial position of said elongated air filter drum; and
drive means operatively engageable with said at least two carrier rollers for imparting rotation to said at least two carrier rollers, and consequently rotation of said elongated filter drum about said elongated mounting shaft.

2. An apparatus as defined in claim 1, wherein said at least two carrier rollers have friction producing surfaces.

3. An apparatus as defined in claim 1, wherein the mounting structure further has: spaced pedestals located exteriorly of said elongated air filter drum to which the two ends of said elongated mounting shaft are mounted.

4. An apparatus as defined in claim 1, wherein said at least two carrier roller mounting means comprise radially extending arms each having a free end, with said at least two carrier rollers being mounted at the free end of its respective arm.

5. An apparatus as defined in claim 1, wherein the drive means comprises: a motor; and a gear train connected to the motor and engageable with said at least two carrier rollers.

6. An apparatus as defined in claim 1, wherein the at least two carrier rollers engage the elongated air filter drum near respective ones of said spaced transverse end openings.

7. An apparatus as defined in claim 1, wherein said elongated air filter drum includes two interior longitudinally spaced tracks serving as contacting surfaces for said at least two carrier rollers, wherein said at least two carrier rollers comprise four carrier rollers, two of which make contact with one of said tracks, and the other two of which make contact with the other of said tracks, the points of contact of each of the carrier rollers on each track making contact at opposite sides of an axial vertical plane of the elongated air filter drum which passes through said elongated mounting shaft.

8. An apparatus as defined in claim 1, wherein said elongated air filter drum has interior guide surfaces which cooperate with locally fixed guide means for insuring the axial position of said elongated air filter drum.

9. An apparatus as defined in claim 8, wherein said guide means are formed by flange portions of said at least two carrier rollers.

10. An apparatus as defined in claim 1, wherein said drive means comprises motor means for driving at least one of said at least two carrier rollers in rotation, said motor means being located interiorly of said elongated air filter drum in the vicinity of the closed end of said two transverse end openings.

11. An air cleaning apparatus comprising:
an elongated air filter drum having two spaced transverse end openings;
means for closing one of said two transverse end openings;
an air filter drum mounting structure having: an elongated mounting shaft; at least two carrier rollers; means for mounting said at least two carrier rollers to and at spaced locations along the elongated mounting shaft and within the interior of said elongated air filter drum, said at least two carrier rollers being mounted for rotation relative to their respective mounting means; and an elongated connecting shaft extending generally parallel to the elongated mounting shaft for connecting a pair of carrier rollers;
said elongated air filter drum being supported at spaced locations along its length by said at least two carrier rollers for rotation thereby about said elongated mounting shaft; and
drive means operatively engageable with said at least two carrier rollers for imparting rotation to said at least two carrier rollers, and consequently rotation of said elongated air filter drum about said elongated mounting shaft, wherein said drive means is connected to each elongated connecting shaft for imparting rotation to each elongated connecting shaft, and consequently their respective carrier rollers.

12. An air cleaning apparatus comprising:

an elongated air filter drum having two spaced transverse end openings;

means for closing one of said two transverse end openings;

an air filter drum mounting structure having: an elongated mounting shaft; at least one alignment roller; and at least one arm for mounting said at least one alignment roller to the elongated mounting shaft, each alignment roller being mounted to a free end of its respective arm for engagement with said elongated air filter drum and rotation relative to its respective arm by said elongated air filter drum; at least two carrier rollers; and means for mounting said at least two carrier rollers to and at spaced locations along the elongated mounting shaft, said at least two carrier rollers being mounted for rotation relative to their respective mounting means;

said elongated air filter drum being supported at spaced locations along its length by said at least two carrier rollers for rotation thereby about said elongated mounting shaft; and drive means operatively engageable with said at least two carrier rollers for imparting rotation to said at least two carrier rollers, and consequently rotation of said elongated air filter drum about said elongated mounting shaft.

13. An apparatus as defined in claim 12, wherein said elongated air filter drum includes two interior longitudinally spaced tracks serving at the same time as contacting surfaces for said at least two carrier rollers and said at least one alignment roller.

14. An air cleaning apparatus comprising:

an elongated air filter drum including two spaced transverse end openings and two interior longitudinally spaced tracks;

means for closing one of said two transverse end openings;

an air filter drum mounting structure having: an elongated mounting structure having: an elongated mounting shaft; at least one alignment roller; at least one arm for mounting said at least one alignment roller to the elongated mounting shaft, each alignment roller being mounted to a free end of its respective arm for engagement with said elongated air filter drum and rotation relative to its respective arm by said elongated air filter drum; at least two carrier rollers; and means for mounting said at least two carrier rollers to and at spaced locations along the elongated mounting shaft, said at least two carrier rollers being mounted for rotation relative to their respective mounting means;

said elongated air filter drum being supported at spaced locations along its length by said at least two carrier rollers for rotation thereby about said elongated mounting shaft; and drive means operatively engageable with said at least two carrier rollers for imparting rotation to said at least two carrier rollers, and consequently rotation of said elongated air filter drum about said elongated mounting shaft; wherein said two interior longitudinally spaced tracks serve at the same time as contacting surfaces for said at least two carrier rollers and said at least one alignment roller; and wherein one carrier roller and two alignment rollers make contact with a single track on the interior surface of said elongated air filter drum, with the carrier roller making contact with the single track at the zenith point of the drum.

15. An apparatus as defined in claim 14, wherein the angular distance between the points of contact of said carrier roller and each of said two alignment rollers contacting a single track is approximately 120°.

* * * * *